United States Patent
Amano et al.

(10) Patent No.: US 11,094,457 B2
(45) Date of Patent: Aug. 17, 2021

(54) METHOD FOR MANUFACTURING LAMINATED IRON CORE

(71) Applicant: MITSUI HIGH-TEC, INC., Kitakyushu (JP)

(72) Inventors: Katsumi Amano, Fukuoka (JP);
Yukiya Fukunaga, Fukuoka (JP);
Takashi Fukumoto, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 264 days.

(21) Appl. No.: 15/834,732

(22) Filed: Dec. 7, 2017

(65) Prior Publication Data
US 2018/0166214 A1   Jun. 14, 2018

(30) Foreign Application Priority Data

Dec. 13, 2016   (JP) .............................. JP2016-241478

(51) Int. Cl.
*H01F 41/02*   (2006.01)
*B29C 70/74*   (2006.01)
(Continued)

(52) U.S. Cl.
CPC ......... *H01F 41/0233* (2013.01); *B29C 70/74* (2013.01); *B29C 70/745* (2013.01); *B29C 70/84* (2013.01); *B29C 70/845* (2013.01); *B29C 70/88* (2013.01); *B29C 70/885* (2013.01); *H02K 1/27* (2013.01); *H02K 15/02* (2013.01); *H02K 15/03* (2013.01); *H02K 15/12* (2013.01);
(Continued)

(58) Field of Classification Search
None
See application file for complete search history.

(56) References Cited

U.S. PATENT DOCUMENTS

2008/0276446 A1   11/2008   Amano et al.
2010/0083486 A1   4/2010   Amano et al.
(Continued)

FOREIGN PATENT DOCUMENTS

CN   103339840 A   10/2013
JP   61-268374 A   11/1986
(Continued)

OTHER PUBLICATIONS

Machine English Translation of JP5720834 Spec, Retrieved Dec. 6, 2019 (Year: 2015).*
(Continued)

*Primary Examiner* — Peter L Vajda
*Assistant Examiner* — Adrianna N Konves
(74) *Attorney, Agent, or Firm* — Greenblum & Bernstein, P.L.C.

(57) ABSTRACT

A method for manufacturing a laminated iron core includes preheating a laminated body in which a plurality of iron core pieces are laminated and which includes a resin filling hole, measuring a temperature of the laminated body after preheating the laminated body, determining whether or not the temperature measured is within a predetermined range, feeding the laminated body into a molding device in a case where it is determined that the temperature is within the predetermined range, and filling the resin filling hole of the laminated body with a resin material in the molding device.

7 Claims, 4 Drawing Sheets

(51) Int. Cl.
  *B29C 70/88* (2006.01)
  *B29C 70/84* (2006.01)
  *H02K 15/12* (2006.01)
  *H02K 15/02* (2006.01)
  *H02K 1/27* (2006.01)
  *H02K 15/03* (2006.01)
  *H01F 3/02* (2006.01)
  *B29L 31/00* (2006.01)
  *B29K 705/12* (2006.01)

(52) U.S. Cl.
  CPC .. *B29K 2705/12* (2013.01); *B29K 2995/0008* (2013.01); *B29L 2031/7498* (2013.01); *H01F 3/02* (2013.01)

(56) References Cited

U.S. PATENT DOCUMENTS

| | | |
|---|---|---|
| 2011/0179633 A1 | 7/2011 | Amano et al. |
| 2012/0213946 A1 | 8/2012 | Elam et al. |
| 2012/0303313 A1* | 11/2012 | Moroi ............... C23C 16/52 702/134 |
| 2013/0298384 A1 | 11/2013 | Kato et al. |

FOREIGN PATENT DOCUMENTS

| | | | | |
|---|---|---|---|---|
| JP | 2002122478 A | * | 4/2002 | |
| JP | 2008-42967 A | | 2/2008 | |
| JP | 2008261814 A | * | 10/2008 | ............ G01J 5/0022 |
| JP | 2012213946 A | * | 11/2012 | |
| JP | 2013-059185 | | 3/2013 | |
| JP | 2013-162640 A | | 8/2013 | |
| JP | 5720834 B2 | * | 5/2015 | |

OTHER PUBLICATIONS

Machine English Translation of JP2012213946 Spec, Retrieved Dec. 6, 2019 (Year: 2012).*
Machine English Translation of JP-2002122478-A, Accessed Jun. 4, 2020 (Year: 2002).*
Machine English Translation of JP-2008261814-A, Accessed Jun. 4, 2020 (Year: 2008).*
Machine English Translation of JPS61268374, Retrieved Nov. 16, 2020 (Year: 1985).*

* cited by examiner

METHOD FOR MANUFACTURING LAMINATED IRON CORE

CROSS REFERENCE TO RELATED APPLICATION

This application is based upon and claims the benefit of priority of Japanese Patent Application No. 2016-241478 filed on Dec. 13, 2016, the contents of which are incorporated herein by reference in its entirety.

BACKGROUND OF THE INVENTION

1. Field of the Invention

The present disclosure relates to a method for manufacturing a laminated iron core, and an apparatus for manufacturing the laminated iron core.

2. Description of the Related Art

JP-A-2013-59185, referred to as Patent Literature 1 discloses a method for manufacturing a rotor laminated iron core formed by laminating a plurality of iron core pieces. In the manufacturing method of Patent Literature 1, magnets are inserted into a plurality of magnet-insert holes of a laminated body, and the laminated body is preheated and then, the magnet-insert holes are filled with resin materials, and the magnets are positioned and fixed. Thus, the laminated body can be filled with the resin materials in a temperature environment suitable to be filled with the resin materials by preheating the laminated body before the magnet-insert holes are filled with the resin materials.

Patent Literature 1: JP-A-2013-59185

SUMMARY OF THE INVENTION

Even when the laminated body is preheated before being filled with the resin materials herein, there are cases where a temperature of the laminated body after preheating does not reach a temperature suitable to be filled with the resin materials by certain factors. For example, when the temperature of the laminated body becomes too low, there is a fear that at the time of being filled with the resin materials, solidification of the resin materials becomes rapid and the laminated body cannot be filled with a sufficient amount of the resin materials. Also, when the temperature of the laminated body becomes too high, there is a fear that at the time of being filled with the resin materials, solidification of the resin materials becomes slow and burrs occur by being excessively filled with the resin materials. Thus, there are cases where the laminated body cannot be filled with the resin materials properly even when the laminated body is preheated before being filled with the resin materials.

Hence, the present disclosure relates to a method and an apparatus for manufacturing a laminated iron core properly filled with resin materials.

A method for manufacturing a laminated iron core according to one aspect of the present disclosure includes: preheating a laminated body in which a plurality of iron core pieces are laminated and which includes a resin filling hole; measuring a temperature of the laminated body after preheating the laminated body; determining whether or not the temperature measured is within a predetermined range; feeding the laminated body into a molding device in a case where it is determined that the temperature is within the predetermined range; and filling the resin filling hole of the laminated body with a resin material in the molding device.

An apparatus for manufacturing a laminated iron core according to another aspect of the present disclosure includes: a preheating device which preheats a laminated body in which a plurality of iron core pieces are laminated and which includes a resin filling hole; a temperature sensor which measures a temperature of the laminated body; a molding device which fills the resin filling hole of the laminated body with a resin material; a conveying device which conveys the laminated body ejected from the preheating device to the molding device; and a controller which performs: controlling the preheating device to preheat the laminated body; controlling the temperature sensor to measure the temperature of the laminated body after preheating the laminated body; determining whether or not the temperature measured is within a predetermined range; controlling the conveying device to convey the laminated body to the molding device when it is determined that the temperature is within the predetermined range; and controlling the molding device to fill the resin filling hole with the resin material.

The method and the apparatus for manufacturing the laminated iron core according to the present disclosure can manufacture the laminated iron core properly filled with the resin materials.

DETAILED DESCRIPTION OF THE EXEMPLARY EMBODIMENTS

An embodiment according to the present disclosure described below is an exemplified illustration for describing the present invention. Thus, the present invention should not be limited to the following contents. In the following description, the same numerals are used for the same elements or elements having the same functions, and therefore the overlap description is omitted.

[Configuration of Rotor Laminated Iron Core]

First, a configuration of a rotor laminated iron core 1 will be described with reference to FIGS. 1 and 2. The rotor laminated iron core 1 is a part of a rotor. The rotor is combined with a stator to thereby construct an electric motor. The rotor laminated iron core 1 includes a laminated body 10, a plurality of permanent magnets 12, and a plurality of resin materials 14 as shown in FIG. 1.

In the laminated body 10, a plurality of block bodies B (iron core members) are laminated. In an example shown in FIGS. 1 and 2, in the laminated body 10, six block bodies B1 to B6 are laminated in an order of these block bodies B1 to B6 from the upper side to the lower side. The block bodies B adjacent in a lamination direction (hereinafter simply called a "lamination direction") of the block bodies B are mutually bonded and integrated by, for example, welding (not shown).

Figure 2:
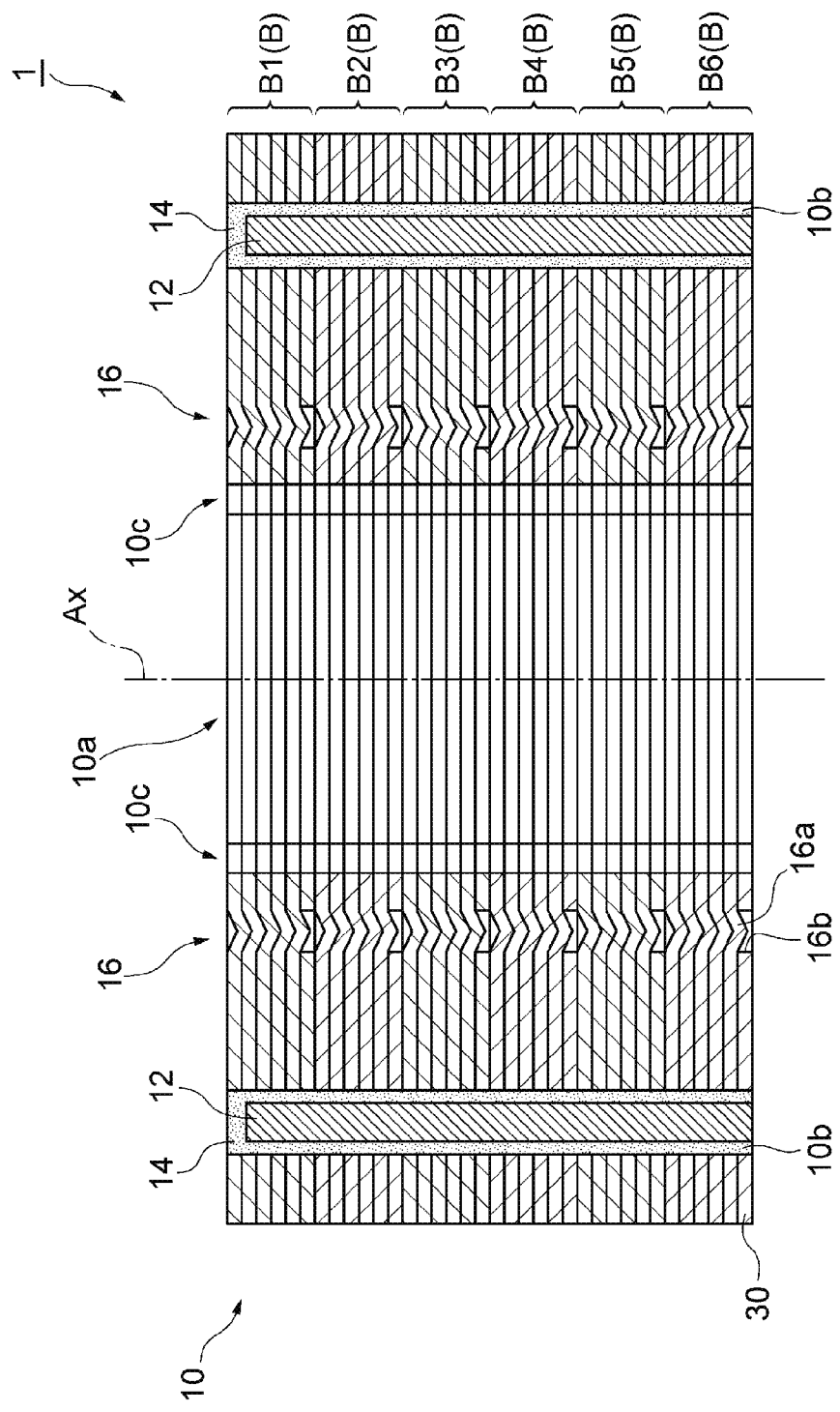
FIG. 2 is a sectional view taken on line II-II of FIG. 1.

As shown in FIG. 2, the block body B is a laminated body formed by stacking a plurality of blanked members 30. The blanked members 30 adjacent in the lamination direction are mutually interlocked by a caulking part 16. The block bodies B adjacent in the lamination direction are not mutually interlocked by the caulking part 16. Concretely, as shown in FIG. 2, the caulking part 16 has caulkings 16a formed in the blanked members 30 forming layers other than the lowest layer of the block body B, and a through hole 16b formed in the blanked member 30 forming the lowest layer of the block body B. The caulking 16a is constructed of a recess formed in the front side of the blanked member 30, and a protrusion formed in the back side of the blanked member 30. The recess of the caulking 16a of one blanked member 30 is bonded to the protrusion of the caulking 16a of the other blanked member 30 adjacent to the front side of the one blanked member 30. The protrusion of the caulking 16a of one blanked member 30 is bonded to the recess of the caulking 16a of the other blanked member 30 further adjacent to the back side of the one blanked member 30. The protrusion of the caulking 16a of the blanked member 30 adjacent to the lowest layer of the rotor laminated iron core 1 is bonded to the through hole 16b. The through hole 16b has a function of preventing the block body B manufactured next to the already manufactured block body B from being interlocked by the caulking 16a in the case of continuously manufacturing the block bodies B.

Figure 1:
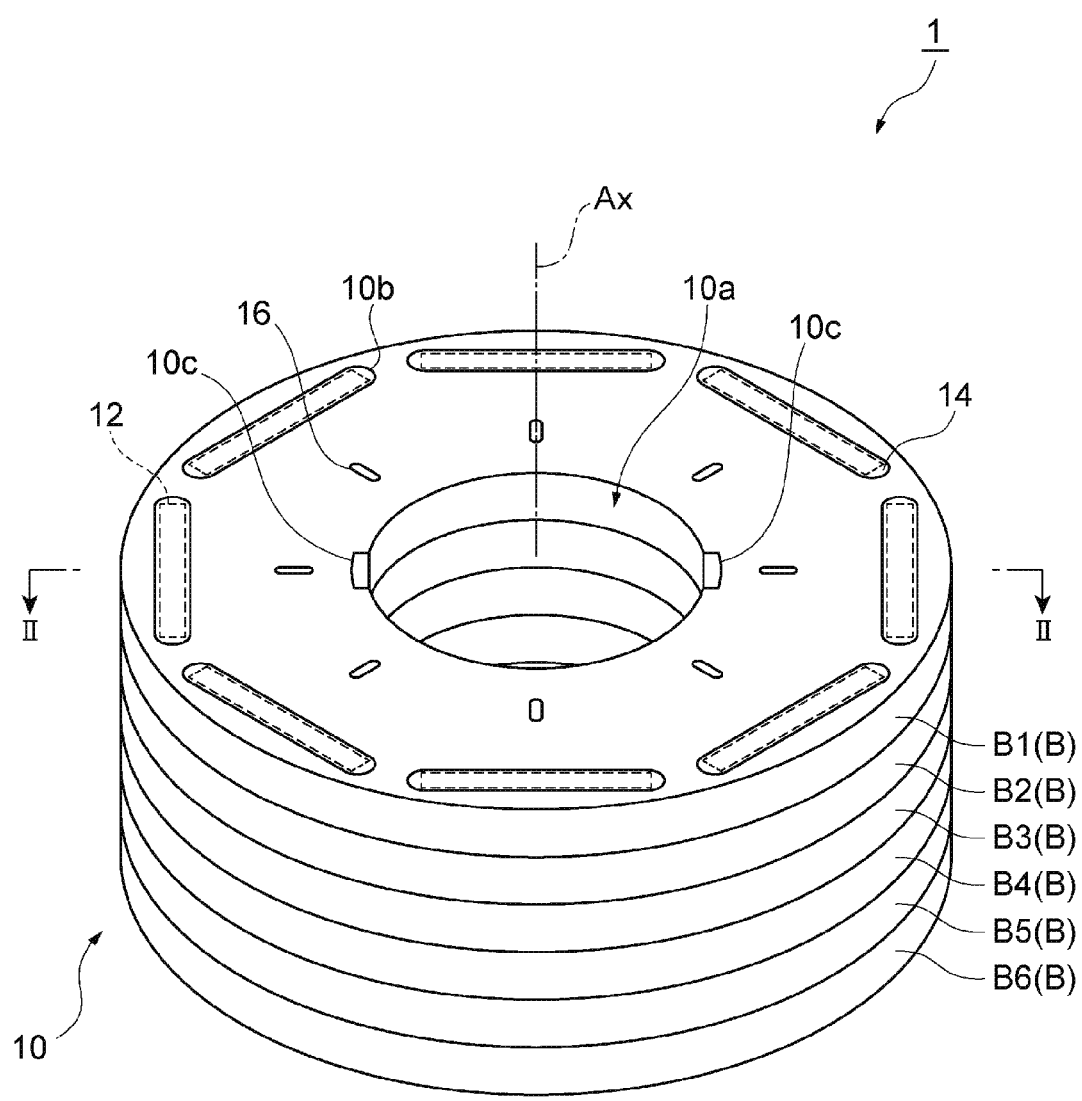
FIG. 1 is a perspective view showing one example of a rotor laminated iron core.

As shown in FIG. 1, the laminated body 10 has a cylindrical shape. As shown in FIGS. 1 and 2, the center of the laminated body 10 is provided with a shaft hole 10a pierced in the laminated body 10 so as to extend along a center axis Ax. The shaft hole 10a extends in the lamination direction of the laminated body 10. The lamination direction is also an extension direction of the center axis Ax. A shaft (not shown) is inserted into the shaft hole 10a.

Figure 3:
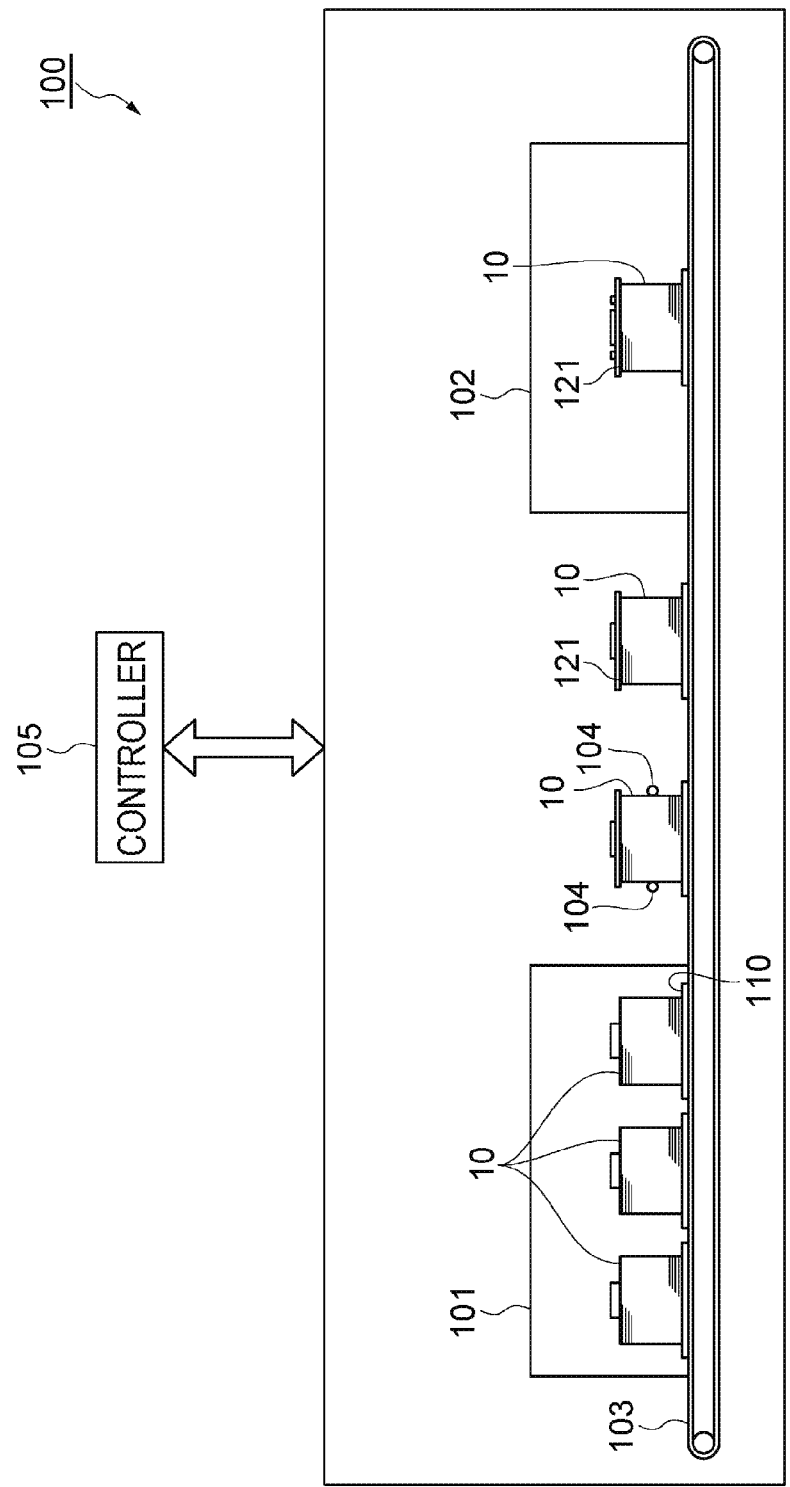
FIG. 3 is a schematic diagram showing one example of an apparatus for manufacturing the rotor laminated iron core.

The laminated body 10 is formed with a plurality of magnet-insert holes 10b (through holes) and a plurality of recesses 10c. As shown in FIGS. 1 and 3, the magnet-insert holes 10b are arranged at predetermined distances along an outer peripheral edge of the laminated body 10. As shown in FIG. 2, the magnet-insert holes 10b are pierced in the laminated body 10 while extending along the center axis Ax (lamination direction).

A shape of the magnet-insert hole 10b is an oblong hole extending along the outer peripheral edge of the laminated body 10 in the embodiment. The number of magnet-insert holes 10b is eight in the embodiment. Positions, shapes and the number of magnet-insert holes 10b may be changed depending on, for example, required performance, use of the motor.

The recess 10c is arranged inside the shaft hole 10a. As shown in FIGS. 1 and 2, the recess 10c is recessed from an inner peripheral surface of the shaft hole 10a toward the radial outside. In the embodiment, a pair of the recesses 10c is opposed to the center axis Ax. That is, the two recesses 10c are arranged inside the shaft hole 10a every 180° with respect to the center axis Ax. The recesses 10c function as, for example, a key groove into which a key member for coupling the rotor laminated iron core 1 to the shaft is inserted. Shapes and the number of recesses 10c may be changed depending on, for example, required performance, use of the motor.

As shown in FIGS. 1 and 2, the permanent magnet 12 is inserted into the magnet-insert hole 10b. The number of permanent magnets 12 inserted into the magnet-insert holes 10b may be one or more. The plurality of permanent magnets 12 may be arranged in the lamination direction, in a circumferential direction of the laminated body 10, or in a radial direction inside the magnet-insert holes 10b. A kind of permanent magnet 12 could be determined depending on, for example, required performance, use of the motor, and may be, for example, a sintered magnet or a bond magnet.

The magnet-insert hole 10b in which the permanent magnet 12 is inserted is filled with the resin material 14. The resin material 14 has a function of fixing the permanent magnet 12 to the magnet-insert hole 10b, and a function of mutually bonding the blanked members 30 adjacent in a vertical direction. The resin material 14 includes, for example, a thermosetting resin. A concrete example of the thermosetting resin includes, for example, a resin composition including an epoxy resin, a curing initiator, and an additive. The additive includes, for example, a filler, a flame retardant, and a stress reducer. In addition, as the resin material 14, a thermoplastic resin may be used.

[Apparatus for Manufacturing Rotor Laminated Iron Core]

Next, an apparatus 100 for manufacturing the rotor laminated iron core 1 (laminated iron core) will be described with reference to FIG. 3. The manufacturing apparatus 100 is an apparatus for manufacturing the rotor laminated iron core 1 from an electromagnetic steel plate which is a strip-shaped metal plate. Concretely the manufacturing apparatus 100 performs processing (blanking processing) for forming the plurality of blanked members 30 by blanking the electromagnetic steel plate in a predetermined shape, processing (block body forming processing) for forming the block body B by laminating the plurality of blanked members 30 while interlocking the plurality of blanked members 30 by the caulking parts 16, processing (laminated body forming processing) for forming the laminated body 10 by laminating the plurality of block bodies B, processing (magnet inserting processing) for inserting the permanent magnets 12 into the magnet-insert holes 10b of the laminated body 10, and processing (resin filling processing) for filling the magnet-insert holes 10b with the resin materials 14. In the embodiment, a configuration of the manufacturing apparatus 100 related to the resin filling processing in each processing described above will be described mainly.

The manufacturing apparatus 100 includes a preheating device 101, a molding device 102, a conveyor 103 (conveying device), temperature sensors 104, and a controller 105 (control part) as shown in FIG. 3 as the configuration related to the resin filling processing described above.

The preheating device 101 is a device which preheats the laminated body 10 which is constructed by laminating the plurality of blanked members 30 (iron core pieces) and which includes the magnet-insert holes 10b (resin filling holes). Concretely the preheating device 101 preheats the laminated body 10 after performing the blanking processing, the block body forming processing, the laminated body forming processing, and the magnet inserting processing described above, that is, the laminated body 10 with the permanent magnets 12 inserted into the magnet-insert holes 10b.

The preheating device 101 heats the laminated body 10 to, for example, 150° C. to 185° C., preferably 160° C. to 175° C. using heated gas or a heater. The laminated body 10 placed on a conveyance jig 110 is conveyed by the conveyor 103, and is carried into the preheating device 101, and is moved inside the preheating device 101 and then, is carried out of the preheating device 101. The laminated body 10 is continuously carried into and carried out of the preheating device 101 by the conveyor 103, and the plurality of laminated bodies 10 are always stored in the preheating device 101.

The molding device 102 is a mold unit having a resin sealing function of extruding the resin materials 14 (resin materials) and filling the magnet-insert holes 10b of the laminated body 10 with the resin materials 14. The molding device 102 has an upper mold (not shown) and a lower mold (not shown), and runs the resin materials 14 into the magnet-insert holes 10b of the laminated body 10 in a state in which the laminated body 10 is held by the upper mold and the lower mold. The molding device 102 may run the resin materials 14 into the magnet-insert holes 10b from any of the upper mold and the lower mold and in the embodiment, the case of running the resin materials 14 into the magnet-insert holes 10b from the upper mold will be described. In this case, the molding device 102 has a resin pool pot (not shown) in the upper mold. In a state in which extrusion of the resin materials 14 by the molding device 102 is started, a cull plate 121 is attached to an upper surface of the laminated body 10. The cull plate 121 is formed with a resin flow path (not shown) in a thickness direction. The laminated body 10 to which the cull plate 121 is attached is arranged between the upper mold and the lower mold of the molding device 102, and the resin materials 14 extruded from the resin pool pot of the upper mold are run into the magnet-insert holes 10b of the laminated body 10 through the resin flow path of the cull plate 121. In addition, the cull plate 121 is attached to the upper surface of the laminated body 10, for example, while the laminated body 10 is conveyed from the preheating device 101 to the molding device 102 by the conveyor 103.

The conveyor 103 is a device which conveys the laminated body 10 ejected from the preheating device 101 to the molding device 102. As described above, the conveyor 103 carries the laminated body 10 into the preheating device 101, and also conveys the laminated body 10 inside the preheating device 101. In addition, the number of conveyors 103 is not limited to one, and, for example, the plurality of conveyors 103 may be formed separately every use (for example, carriage into the preheating device 101).

The temperature sensor 104 measures a temperature of the laminated body 10. As the temperature sensor 104, a contact sensor such as a liquid-filled thermometer or a mercury thermometer may be used, or a non-contact sensor for measuring infrared rays etc. emitted from the laminated body 10 may be used. For the contact sensor, the temperature sensors 104 are formed in, for example, a plurality of different regions of a surface of the laminated body 10, and measure temperatures at the plurality of regions. For the contact sensor, the temperature sensors 104 are formed in, for example, two spots on a diagonal line of the laminated body 10 in a radial direction, and measure temperatures of the two places. In addition, for the non-contact sensor, the temperature sensors 104 may measure temperatures from a certain place toward a plurality of spots.

The controller 105 generates instruction signals for respectively operating the preheating device 101, the molding device 102, the conveyor 103 and the temperature sensor 104 based on, for example, a program recorded on a recording medium (not shown) or a manipulation input from an operator, and respectively sends the instruction signals to the preheating device 101, the molding device 102, the conveyor 103 and the temperature sensor 104.

Concretely, in a first processing, the controller 105 controls the preheating device 101 and preheats the laminated body 10. In a second processing, the controller 105 controls the temperature sensor 104 and measures a temperature of the laminated body 10 after the first processing. In a third processing, the controller 105 determines whether or not the temperature measured in the second processing is within a predetermined range. The predetermined range of the temperature in the third processing is in the range of, for example, 150° C. to 185° C., preferably 160° C. to 175° C. In a fourth processing, the controller 105 controls the conveyor 103 and conveys the laminated body 10 to the molding device 102 when the temperature is within the predetermined range in the third processing. In a fifth processing, the controller 105 controls the molding device 102 and extrudes the resin materials 14 and fills the magnet-insert holes 10b with the resin materials 14 (fifth processing).

In the second processing, the controller 105 may control the temperature sensor 104 and measure a temperature of the laminated body 10 while controlling the conveyor 103 and conveying the laminated body 10 in a direction of the molding device 102.

Also, in the second processing, the controller 105 may control the temperature sensor 104 and measure the laminated body 10 in temperature at a plurality of spots (for example, temperatures at two spots on a diagonal line of the laminated body 10 in a radial direction). The controller 105 may control the temperature sensor 104 and measure the laminated body 10 in temperature at the plurality of spots at the mutually same timing. In this case, in the third processing, the controller 105 may determine whether or not a difference between the temperatures at the plurality of spots is smaller than a predetermined value (for example, 10° C., 5° C., or 3° C.) in addition to the case where each of the temperatures of the plurality of spots is within the above predetermined range (150° C. to 185° C.). In this case, in the fourth processing, the controller 105 may control the conveyor 103 and convey the laminated body 10 to the molding device 102 (feed the laminated body 10 into the molding device 102) in the case of determining that the difference between the temperatures at the plurality of spots is smaller than the predetermined value in the third processing.

In addition, when the temperature is not within the predetermined range in the third processing, or when the difference between the temperatures at the plurality of spots is not smaller than the predetermined value in the third processing, the controller 105 controls the conveyor 103 and excludes the laminated body 10 from a conveyance path to the molding device 102. Thus, the laminated body 10 in which the condition of the temperature is not satisfied in the third processing is not fed into the molding device 102. The laminated body 10 excluded from the conveyance path may be again fed into the preheating device 101 by the conveyor 103.

[Method for Manufacturing Rotor Laminated Iron Core]

Next, a method for manufacturing the rotor laminated iron core 1 will be described with reference to FIG. 4. Like the description of the manufacturing apparatus 100, a step related to the resin filling processing in steps of manufacturing the rotor laminated iron core 1 will be described mainly.

Figure 4:
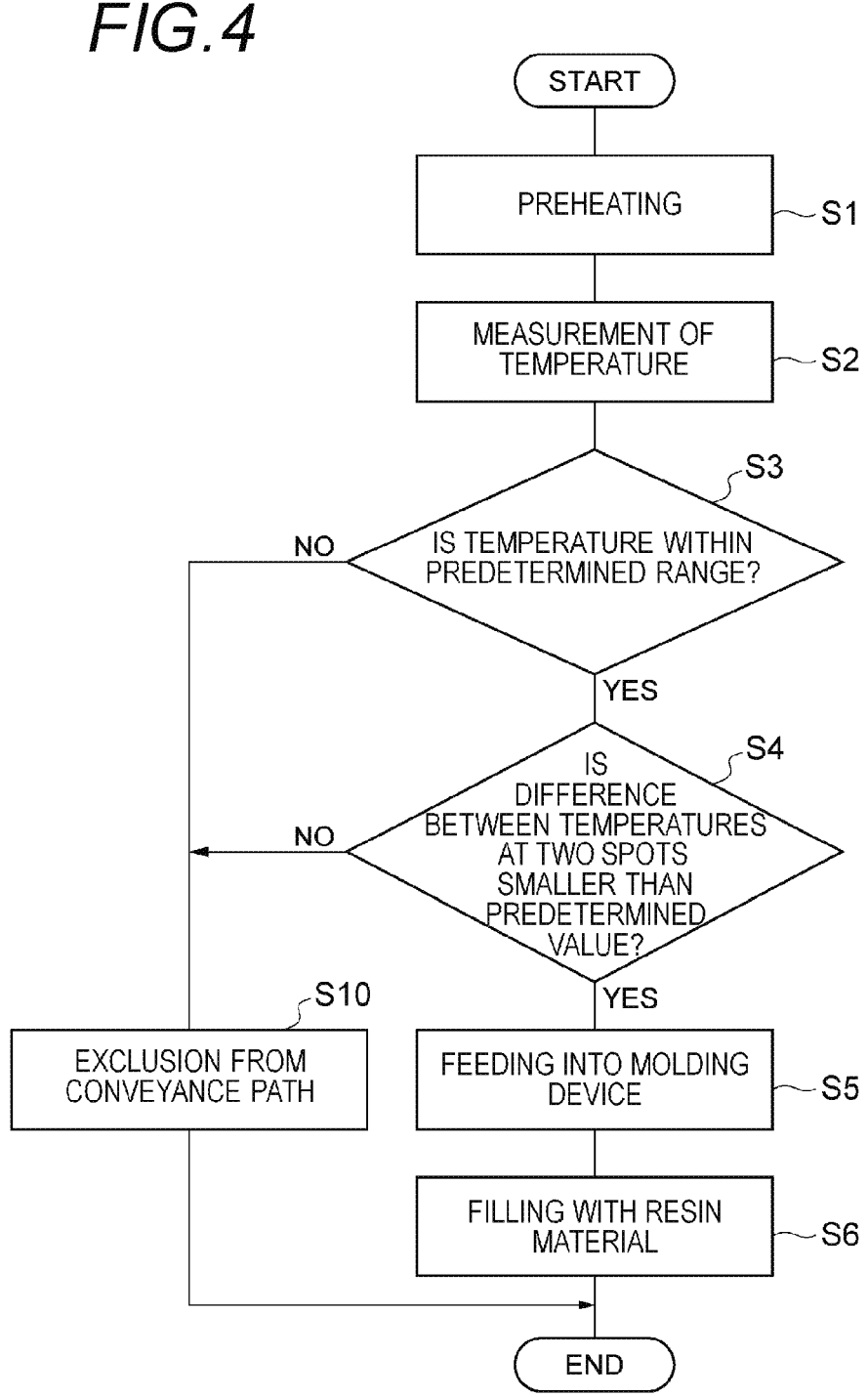
FIG. 4 is a flowchart describing one example of a method for manufacturing the rotor laminated iron core.

First, the laminated body 10 which is constructed by laminating the plurality of blanked members 30 and which includes the magnet-insert holes 10b is preheated (first step, first processing, see step S1 of FIG. 4). Concretely, the laminated body 10 is preheated by the preheating device 101 based on instructions of the controller 105.

Next, a temperature of the laminated body 10 preheated in step S1 is measured (second step, second processing, see step S2 of FIG. 4). Concretely, the temperature of the laminated body 10 after preheating is measured by the temperature sensor 104 based on instructions of the controller 105. In step S2, temperatures at two spots of a surface of the laminated body 10 are measured by the temperature sensor 104 based on the instructions of the controller 105. In addition, step S2 may be performed while conveying the laminated body 10 toward the molding device 102. Concretely, the temperature of the laminated body 10 may be measured by the temperature sensor 104 while conveying the laminated body 10 toward the molding device 102 by the conveyor 103 based on instructions of the controller 105.

Subsequently it is determined whether or not the temperature measured in step S2 is within a predetermined range (third step, third processing, see step S3 of FIG. 4). Concretely, the controller 105 determines whether or not the temperatures at the two spots of the surface of the laminated body 10 measured by the temperature sensor 104 are within the range of, for example, 150° C. to 185° C.

In the case of determining that the temperature is within the predetermined range in step S3, it is further determined whether or not a difference between the temperatures at the plurality of spots (two spots) measured in step S2 is smaller than a predetermined value (third step, third processing, see step S4 of FIG. 4). Concretely, the controller 105 determines whether or not the difference between the temperatures at the two spots of the surface of the laminated body 10 measured by the temperature sensor 104 is smaller than, for example, 10° C.

In the case of determining that the temperature is not within the predetermined range in step S3, or in the case of determining that the difference between the temperatures at the two spots is not smaller than the predetermined value in step S4, the laminated body 10 whose temperature is measured is excluded from a conveyance path (see step S10 of FIG. 4). Concretely, the laminated body 10 is excluded from the conveyance path to the molding device 102 by the conveyor 103 based on instructions of the controller 105. Accordingly, the laminated body 10 in which the condition on the temperature is not satisfied is not fed into the molding device 102.

On the other hand, in the case of determining that the temperature is within the predetermined range in step S3 and determining that the difference between the temperatures at the two spots is smaller than the predetermined value in step S4, the laminated body 10 is fed into the molding device 102 (fourth step, fourth processing, see step S5 of FIG. 4). Concretely, the laminated body 10 is conveyed to the molding device 102 by the conveyor 103 based on instructions of the controller 105.

Finally, the resin materials 14 are extruded from the molding device 102, and the magnet-insert holes 10b are filled with the resin materials 14 (fifth step, fifth processing, see step S6 of FIG. 4). Concretely, the magnet-insert holes 10b of the laminated body 10 are filled with the resin materials 14 through the resin flow path of the cull plate 121 by extruding the resin materials 14 from the resin pool pot of the upper mold of the molding device 102 based on instructions of the controller 105. As described above, the rotor laminated iron core 1 in which the magnet-insert holes 10b are filled with the resin materials 14 can be manufactured.

[Action]

The magnet-insert holes of the laminated body are preferably filled with the resin materials in a temperature environment suitable to be filled with the resin materials. Because of this, the laminated body may be preheated by the preheating device before being filled with the resin materials by the molding device in order to set a temperature of the laminated body to a desired temperature. However, even when the laminated body is preheated, there are cases where the temperature of the laminated body after preheating does not reach the temperature suitable to be filled with the resin materials by various factors.

For example, when processing in the molding device is stopped for some reason, conveyance of the laminated body from the preheating device to the molding device is also stopped. In this case, a temperature environment of the laminated body varies greatly depending on waiting in any position of the inside of the preheating device (or the conveyance path from the preheating device to the molding device). As a result, the laminated body whose temperature does not reach the temperature suitable to be filled with the resin materials may be generated at the time of being filled with the resin materials by the molding device. When the temperature of the laminated body becomes too low, at the time of being filled with the resin materials, the viscosity of the resin materials becomes high and fluidity decreases, with the result that unfilling with the resin may occur. Also, when the temperature of the laminated body becomes too high, at the time of being filled with the resin materials, the viscosity of the resin materials becomes low and fluidity increases, with the result that burrs may occur by being excessively filled with the resin materials. Thus, even when the laminated body is preheated before being filled with the resin materials, in both of the case where the temperature of the laminated body becomes too low and the case where the temperature of the laminated body becomes too high, there are cases where during a predetermined filling time, sure resin filling cannot be performed and the laminated body cannot be filled with the resin materials properly.

In this respect, in the embodiment described above, the temperature of the laminated body 10 after preheating is measured in the second step, and it is determined whether or not the temperature is within the predetermined range in the third step, and only when the temperature is within the predetermined range, the laminated body 10 is fed into the molding device 102 in the fourth step. According to such a manufacturing method, the magnet-insert holes 10b are filled with the resin materials 14 only when the temperature of the laminated body 10 after preheating is within the predetermined range. Accordingly, for example, by setting the predetermined range of the temperature described above in a temperature zone suitable to be filled with the resin materials 14, the laminated body 10 whose temperature does not reach the temperature suitable to be filled with the resin materials 14 after preheating for some reason can be excluded from a target of filling with the resin materials 14. Consequently, the laminated body 10 whose temperature after preheating reaches the temperature suitable to be filled with the resin materials 14 is filled with the resin materials 14, and the rotor laminated iron core 1 properly filled with the resin materials 14 can be manufactured.

Also, in the method for manufacturing the rotor laminated iron core 1 in the embodiment, the temperature of the laminated body 10 may be measured while conveying the laminated body 10 toward the molding device 102 in the second step. It is necessary to convey the laminated body 10 to the molding device 102 after preheating. In this respect, by measuring the temperature of the laminated body 10 during the conveyance, a lead time can be shortened as compared with, for example, the case of measuring the temperature after the conveyance.

Further, in the method for manufacturing the rotor laminated iron core 1 in the embodiment, in the second step, the laminated body is measured in temperature at a plurality of spots, and in the third step, it is determined whether or not a difference between the temperatures at the plurality of spots measured in the second step is smaller than a predetermined value, and in the fourth step, the laminated body 10 may be fed into the molding device 102 in the case of determining that the difference between the temperatures at the plurality of spots is smaller than the predetermined value in the third step. When the difference between the temperatures at the plurality of spots is large, unfilling or burrs may occur depending on the filled places in the case of being filled with the resin materials 14. In this respect, by feeding the laminated body 10 into the molding device 102 only when the difference between the temperatures at the plurality of spots is smaller than the predetermined value, the laminated body 10 in which unevenness of a filling state described above may occur can be excluded from a target of filling.

MODIFIED EXAMPLE

The embodiment according to the present disclosure has been described above in detail, but various modifications may be added to the embodiment described above within the gist of the present invention.

For example, the method for manufacturing the rotor laminated iron core 1 in which the magnet-insert holes 10b of the laminated body 10 are filled with the resin materials 14 is described, but the present invention is not limited to this method, and a method for manufacturing a rotor laminated iron core in which resin filling holes into which magnets are not inserted are filled with resin materials may be used, or a method for manufacturing a stator laminated iron core in which resin filling holes are filled with resin materials may be used.

Also, the case of determining whether or not the difference between the temperatures at the two spots is smaller than the predetermined value in addition to determining whether or not the temperature is within the predetermined range in the third step is described, but the present invention is not limited to this case, and it may be only determined whether or not the temperature is within the predetermined range. In this case, in the second step, the temperature sensor may measure a temperature at one spot of the surface of the laminated body. Also, in the second step, the temperature sensor may measure temperatures at three or more spots of the surface of the laminated body. Further, when the temperature sensor measures temperatures at a plurality of spots in the second step, timing of temperature measurement in each of the places may differ. Further, it may be constructed so that the temperature sensor is installed on a conveyance jig (particularly, a post part) and a temperature of the surface of the inside diameter side of the laminated body is measured in the second step.

Also, the case of measuring the temperature of the laminated body 10 while conveying the laminated body 10 toward the molding device 102 in the second step is described, but the temperature of the laminated body may be measured after the completion of conveyance. Also, the example using the cull plate 121 in order to be filled with the resin materials 14 is described, but it may be constructed so that the laminated body is directly filled with the resin materials from the mold unit without using the cull plate and a burring device is used after being filled with the resin materials.

The reference numerals/signs with the constituent elements used in describing the embodiment of the present disclosure are listed as below.

1 . . . ROTOR LAMINATED IRON CORE (LAMINATED IRON CORE)
10 . . . LAMINATED BODY
10b . . . MAGNET-INSERT HOLE (RESIN FILLING HOLE)
12 . . . PERMANENT MAGNET
14 . . . RESIN MATERIAL (RESIN MATERIAL)
30 . . . BLANKED MEMBER (IRON CORE PIECE)
100 . . . MANUFACTURING APPARATUS
101 . . . PREHEATING DEVICE
102 . . . MOLDING DEVICE
103 . . . CONVEYOR (CONVEYING DEVICE)
104 . . . TEMPERATURE SENSOR
105 . . . CONTROLLER (CONTROL PART)

What is claimed is:

1. A method for manufacturing a laminated iron core, the method comprising:
providing a laminated body in which a plurality of iron core pieces are laminated and which includes a resin filling hole;
preheating the laminated body inside a preheater;
measuring a temperature of the preheated laminated body, with a temperature sensor, outside of the preheater and between the preheater and a mold;
determining whether or not the temperature measured is within a predetermined range;
feeding the laminated body into the mold in a case where it is determined that the temperature is within the predetermined range; and
filling the resin filling hole of the laminated body with a resin material in the mold,
wherein the temperature of the laminated body is measured while conveying the laminated body together with the temperature sensor toward the mold.

2. The manufacturing method according to claim 1, wherein the laminated body is measured in temperature at a plurality of spots, and
it is determined whether or not a difference between the temperatures measured at the plurality of spots is smaller than a predetermined value, and
the laminated body is fed into the mold in a case where it is determined that the difference between the temperatures measured at the plurality of spots is smaller than the predetermined value.

3. The manufacturing method according to claim 1, further comprising excluding the laminated body from a conveyance path to the mold in a case where it is not determined that the temperature is within the predetermined range.

4. The manufacturing method according to claim 1, further comprising conveying the preheated laminated body toward the mold, wherein
the temperature of the preheated laminated body is measured before feeding the laminated body into the mold.

5. The manufacturing method according to claim 3, further comprising feeding the laminated body excluded from the conveyance path to the mold into the preheater again.

6. The manufacturing method according to claim 3, wherein feeding the laminated body and excluding the laminated body are performed by a conveyor.

7. The manufacturing method according to claim 2, wherein the temperature measurements taken at the plurality of spots includes at least two spots in a radial direction and on a diagonal line of the laminated body.

\* \* \* \* \*